(12) United States Patent
Hoernig

(10) Patent No.: US 7,227,154 B2
(45) Date of Patent: Jun. 5, 2007

(54) METHOD FOR OPERATING A FLAT DETECTOR WITH REDUCED SWITCHING ARTIFACTS

(75) Inventor: Mathias Hoernig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 36 days.

(21) Appl. No.: 11/252,574

(22) Filed: Oct. 19, 2005

(65) Prior Publication Data

US 2006/0081788 A1    Apr. 20, 2006

(30) Foreign Application Priority Data

Oct. 20, 2004   (DE)  ................. 10 2004 051 171

(51) Int. Cl.
  *G01J 1/42*    (2006.01)
(52) U.S. Cl. ............................................. 250/395
(58) Field of Classification Search ........... 250/370.09, 250/395; 378/98.7, 98.8, 116, 207
  See application file for complete search history.

(56) References Cited

U.S. PATENT DOCUMENTS

2004/0223590 A1 * 11/2004 Geiger et al. ............... 378/154

2005/0161610 A1 * 7/2005 Spahn ................... 250/370.09

FOREIGN PATENT DOCUMENTS

| DE | 195 07 762 A1 | 9/1996 |
| DE | 195 08 690 A1 | 9/1996 |
| DE | 101 49 404 A1 | 4/2003 |
| DE | 103 12 450 A1 | 10/2004 |

* cited by examiner

Primary Examiner—David Porta
Assistant Examiner—Marcus Taningco
(74) Attorney, Agent, or Firm—Harness, Dickey & Pierce, P.L.C.

(57) ABSTRACT

A method is disclosed for operating a flat detector in different dose ranges and at different amplifier levels. A previously measured detector sensitivity is respectively used for the calibration. The detector sensitivity is determined for each amplifier level at a multiplicity of different points in the overall gain-specific dose range. Further, a calibration value of the previously measured neighboring values is used in order to calibrate a measurement image for a predetermined dose.

20 Claims, 1 Drawing Sheet

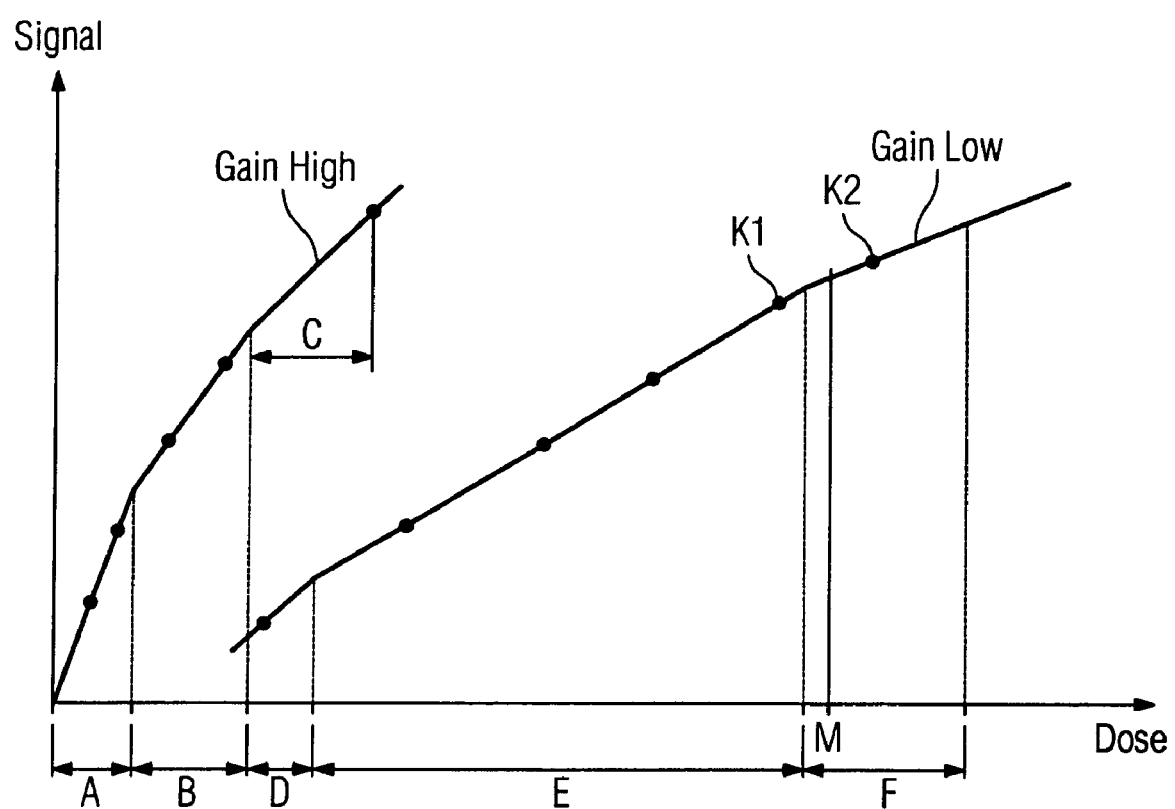

METHOD FOR OPERATING A FLAT DETECTOR WITH REDUCED SWITCHING ARTIFACTS

The present application hereby claims priority under 35 U.S.C. §119 on German patent application number DE 10 2004 051 171.3 filed Oct. 20, 2004, the entire contents of which is hereby incorporated herein by reference.

FIELD

The invention generally relates to a method for operating a flat detector. For example, it may generally relate to a method for operating the flat detector in different dose ranges and at different amplifier levels, in which a previously measured detector sensitivity is respectively used for the calibration, for example.

BACKGROUND

Flat detectors are operated at different amplification levels, in order to be able to cover a dose range which is as large as possible. In fluoroscopy applications, for example, the largest analog gain in the detector electronics is selected in order to achieve a desired signal threshold. For recording operation in which high doses are employed, a lower amplification is then used.

Changing the amplifier levels in the detector—7 gain levels are usual in modern equipment—entails switching artifacts which lead to degradations in the image quality and are directly visible after switching as so-called overshoot processes with reduced image quality. Because of the non-linearity of the detector within a detector mode, it is not possible to achieve integral linearity over the entire dose range to be covered so that, in the previously available measuring methods, it has also not been possible to reduce the number of amplifier levels and cover a maximally large dose range with one detector mode.

SUMMARY

It is therefore an object of at least one embodiment of the invention to provide a method for operating a flat detector, in which the individual detector modes can be used more favorably over their entire range. It is therefore possible to reduce the number of amplifier levels required and therefore also the switching artifacts associated with switching them.

In order to achieve this object, according to at least one embodiment of the invention, the detector sensitivity is determined for each amplifier level at a multiplicity of different points in the overall gain-specific dose range, in particular by varying the tube voltage, and a calibration value of the previously measured neighboring values is used in order to calibrate a measurement image for a predetermined dose.

In one configuration of at least one embodiment of the invention, the measured detector signal curve for the entire dose range may furthermore be provided as a lookup table or the like for dose control.

After the sensitivity determination, a new detector calibration may also be carried out for those dose levels at which a sensitivity differing from a specific threshold value is found. The gain and defect maps generated in this way are selected by the system in the dose-related preprocessing pipeline so that they cover a system dose range in which the detector is essentially linear.

The departure from the former procedure, in which the detector sensitivity was determined at only one measurement point for each mode, is essential to the operating method according to at least one embodiment of the invention. This value was then used for the entire dose in which the mode is operated, irrespective of the dose in question, but this leads to considerable errors owing to the probable lack of linearity of the detector.

An advantage of dose-dependent determination of the detector sensitivity is that it is possible to cover larger dose ranges with one detector mode, so that it is possible to significantly reduce the previously required switching of the detector modes to cover a particular dose range, with all its disadvantages for the image quality.

With the proposed solution, the X-ray system can determine precisely the ranges in which the detector is linear, and provide the exact sensitivity values for the dose control. For system doses which deviate more strongly from the adjustment doses for determining the sensitivity (for example for DEXI, DEXI-Adjust, Digital Exposure Index), X-ray systems show inaccurate or, depending on the detector linearity, significantly incorrect system doses on the monitor. This can be prevented by the proposed solution.

BRIEF DESCRIPTION OF THE DRAWINGS

Further advantages, features and details of the invention can be found in the following description of an example embodiment and with reference to the drawing.

The drawing shows the dose-dependent sensitivity of a flat detector at two different gain levels.

DETAILED DESCRIPTION OF THE EXAMPLE EMBODIMENTS

The schematically simplified drawing represents two curves, on the one hand Gain High and on the other hand Gain Low, i.e. for the most extreme amplifier levels which overlap in certain ranges. Each of the gain curves shows that it includes at most a few more or less linear sub-ranges. They further show that there is never a uniform linear sensitivity over the entire detector mode. The three linear working ranges A, B and C can be seen for the Gain High curve, while the Gain Low curve comprises three essentially linear sections D, E and F.

In contrast to the former procedure, a detector calibration is carried out after a sensitivity determination for various dose levels at the positions indicated by individual circles, i.e. the Gain High curve and the Gain Low curve are measured at the dose values corresponding to these positions. If a measurement subsequently needs to be taken at the dose value M for imaging, then the neighboring calibration values K1 and K2 are correspondingly averaged in order to obtain the calibration value suitable for the measurement at the dose M in the Gain Low mode.

Clearly, virtually the entire dose range can be covered merely by the two gain modes shown, i.e. the highest gain mode and the lowest gain mode, so that switching between different amplifier levels only has to take place very much less often than before, and the risk of switching artifacts can be reduced significantly.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for operating a flat detector in different dose ranges and at different amplifier levels, in which a previously measured detector sensitivity is used for calibration, comprising:
   determining detector sensitivity for each amplifier level at a multiplicity of different points in an overall gain-specific dose range; and
   using a calibration value of previously measured neighboring values to calibrate a measurement image for a dose.

2. The method as claimed in claim 1, wherein a measured detector signal curve for the entire dose range is provided.

3. The method as claimed in claim 1, wherein the detector sensitivity is determined as a function of tube voltage.

4. The method as claimed in claim 1, wherein a new detector calibration is carried out after the sensitivity determination for those dose levels at which a sensitivity exceeding a threshold value is found.

5. The method as claimed in claim 1, wherein gain correction is carried out pixel-wise and dose-dependently by the interpolation of previously acquired dose-specific calibration data.

6. The method as claimed in claim 2, wherein the measured detector signal curve is provided as a lookup table.

7. The method as claimed in claim 1, wherein the detector sensitivity is KV dependent.

8. The method as claimed in claim 2, wherein a new detector calibration is carried out after the sensitivity determination for those dose levels at which a sensitivity exceeding a threshold value is found.

9. The method as claimed in claim 2, wherein gain correction is carried out pixel-wise and dose-dependently by the interpolation of previously acquired dose-specific calibration data.

10. The method as claimed in claim 3, wherein gain correction is carried out pixel-wise and dose-dependently by the interpolation of previously acquired dose-specific calibration data.

11. A method for calibrating a flat detector in different dose ranges and at different amplifier levels, comprising:
    determining detector sensitivity for a plurality of amplifier levels at a plurality of different points in a dose range; and
    calibrating a measurement for a dose using a calibration value of previously measured neighboring values.

12. The method as claimed in claim 11, wherein a measured detector signal curve for the entire dose range is provided.

13. The method as claimed in claim 11, wherein the detector sensitivity is determined as a function of tube voltage.

14. The method as claimed in claim 11, wherein a new detector calibration is carried out after the sensitivity determination for those dose levels at which a sensitivity exceeding a threshold value is found.

15. The method as claimed in claim 11, wherein gain correction is carried out pixel-wise and dose-dependently by the interpolation of previously acquired dose-specific calibration data.

16. The method as claimed in claim 12, wherein the measured detector signal curve is provided as a lookup table.

17. The method as claimed in claim 11, wherein the detector sensitivity is KV dependent.

18. The method as claimed in claim 12, wherein a new detector calibration is carried out after the sensitivity determination for those dose levels at which a sensitivity exceeding a threshold value is found.

19. The method as claimed in claim 12, wherein gain correction is carried out pixel-wise and dose-dependently by the interpolation of previously acquired dose-specific calibration data.

20. The method as claimed in claim 13, wherein gain correction is carried out pixel-wise and dose-dependently by the interpolation of previously acquired dose-specific calibration data.

* * * * *